Figure 1:
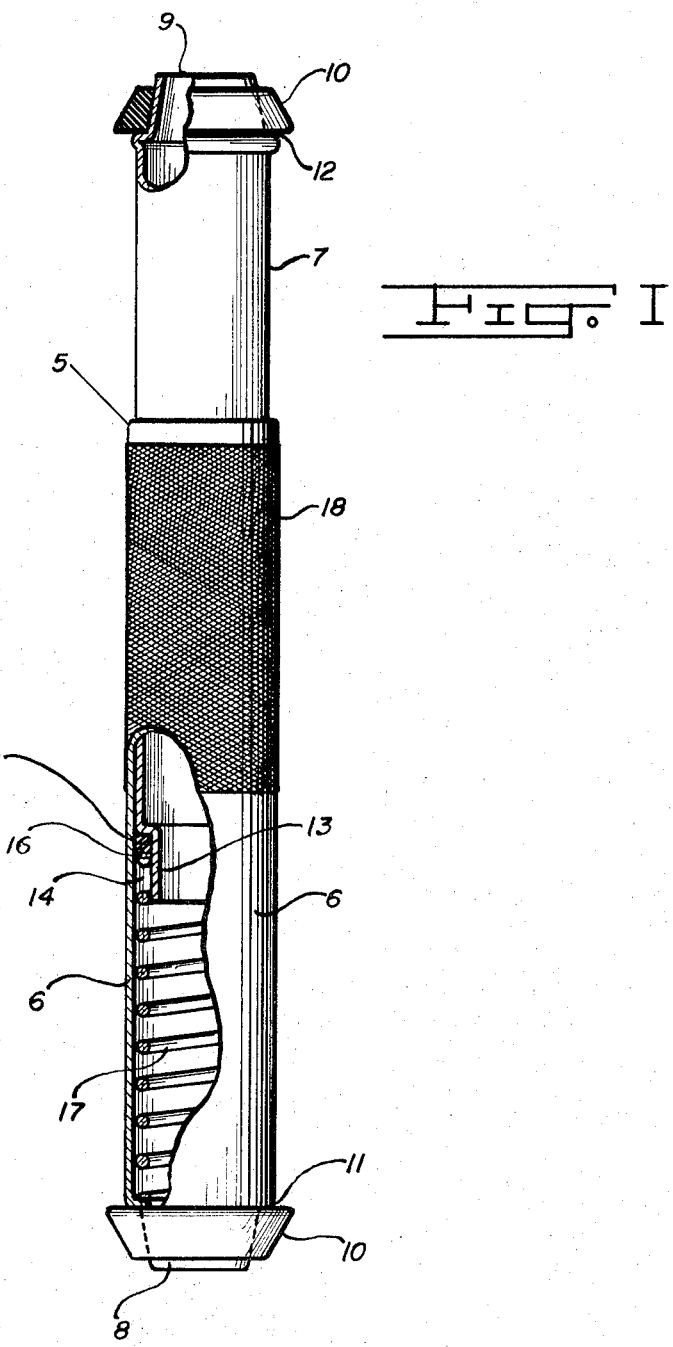

United States Patent [19]

Davis, Jr.

[11] 3,859,969
[45] Jan. 14, 1975

[54] TELESCOPING PUSHROD TUBE
[76] Inventor: George B. Davis, Jr., 7512 Marbury Rd., Bethesda, Md.
[22] Filed: July 30, 1973
[21] Appl. No.: 383,482

[52] U.S. Cl............. 123/90.61, 74/583, 123/90.62, 267/166
[51] Int. Cl............................................. F01l 1/14
[58] Field of Search ........ 123/90.61, 90.62; 74/583; 267/61, 166, 174, 65, 71, 169, 176

[56] References Cited
UNITED STATES PATENTS

| | | | |
|---|---|---|---|
| 1,977,778 | 10/1934 | Rice | 123/90.61 |
| 2,002,982 | 5/1935 | Hudson | 123/90.62 |
| 2,602,662 | 7/1952 | Kintzinger | 267/176 |
| 2,858,817 | 11/1958 | Line | 123/90.61 |
| 2,956,796 | 10/1960 | Devillers | 267/65 R |
| 3,194,370 | 7/1962 | Bennett | 267/61 |
| 3,677,561 | 7/1972 | McNally | 267/65 R |
| 3,752,461 | 8/1973 | Gratzmuller | 267/65 R |

Primary Examiner—Manuel A. Antonakas
Assistant Examiner—Daniel J. O'Connor

[57] ABSTRACT

A pushrod tube and particularly an improvement in a pushrod tube of the type adapted specifically for use with a horizontal air cooled engine as commonly used in Volkswagens and serves to extend between the block and head to inclose individually each of the pushrods that operate the valves of the engine by rotation of the cam shaft.

5 Claims, 1 Drawing Figure

TELESCOPING PUSHROD TUBE

While this invention relates generally to push rod inclosures, it pertains particularly to a push rod inclosure of the telescoping type which, by reason of its unique structure, may be hand installed within a Volkswagen without the usual procedure of removing the cylinder head or the use of special tools as is generally required when installing or replacing a push rod inclosure in an engine of this type.

In addition to the ease of installation, the structure of the device is such as to maintain a continuous pressure upon all gasket seals used in the device and between the device and the head and the block of the engine and by this application of constant pressure upon the oil retaining seals prevents the most common cause of pushrod inclosure failure by oil leakage from these sealing surfaces resulting from high temperature changes and constant vibration occurring during engine operation.

It is an object of the present invention to provide a new and improved push rod inclosure that will telescope into place between the head and block of an engine of the type described and yieldably retain itself in position without removal of the engine head and while maintaining all oil sealing gaskets pertaining thereto under constant pressure thusly preventing oil leakage by these sealing surfaces regardless of long exposure to engine vibration and extreme temperature changes.

A further object is to provide a push rod inclosure of the type disclosed that, while being rugged in structure and efficient in operation, is relatively cheap to manufacture and adaptable particularly to the Volkswagen engine.

A better understanding of the device and its advantages may be had by referring now to the accompanying drawing wherein:

FIG. 1 is a plan view in elevation of the invention partly cut-away to disclose the arrangement of the parts and their relative operative relation.

Referring now to the drawing of FIG. 1 wherein is shown the invention as will here be generally designated 5. The device of 5 includes two closely fitting telescoping sections 6 and 7 with the comparatively long bearing surface 8 providing for a rugged smooth operating structure.

Upon the free end of each end of the sections 6 and 7 are, reduced in diameter, tubular extensions 8 and 9 respectively, over which are sleeved conical like resillient gaskets members 10. The flanges 11 and 12, formed at the point of necking down or reducing the ends of the tubular sections 8 and 9, serve to compress these gaskets in oil sealing relation about the tubes and to the block and head of the engine when the device is mounted therebetween and which will become more readily apparent as the description proceeds.

It will be here noted that the tubular extensions 8 and 9 are somewhat tapered inwardly toward their external end to provide for more positively mounting between the block and the head of the engine when the receiving holes within the block and head are considerably out of alignment as is the case with the Volkswagen engine.

Formed upon the inner end of the tubular section 7 is a reduced tubular like extension 13 to form therebetween and the tubular section 6 a recess 14. Within this recess is positively retained an annular oil sealing gasket 15 and compression ring 16, which in use of the device, is maintained in oil sealing relation between the sections 6 and 7 by the spring 17.

The spring 17 positioned between the washer 16 and inner flange 11, formed by the necking down of the extension 6, yieldably urges the tubular sections 6 and 7 in opposite directions along their longitudinal axis in such a manner that when the device is mounted between the block and head of an engine, all oil sealing gaskets of the assembly are continuously maintained under oil sealing compression regardless of vibration or temperature changes that could otherwise cause gasket fatigue and leakage, a fault common with convention push rod inclosures of this type.

The positive confinement of the gasket and compression ring within the elongated inner recess 14 formed between the telescoping members 6 and 7, prevents shifting or possible dislocation of the oil seal under severe road shock and vibration that could shift an oil seal maintained in a less secure manner.

Further, the reduced tapered tubular end portions 8 and 9 of the tubular body sections, extend sufficiently inward into the annular bores formed therefor within the block and head of a Volkswagen engine as to prevent their being vibrated or shocked from their secured oil sealing position.

While the device 5 shows the spring 17 confined within the tubular section 16, it is understood that the spring may be, though less desirable, located over the tubular section 7 and bearing against the shoulder 12.

The outer surface of the section 6 is preferably knurled at 18 to provide a more positive gripping surface for manual telescoping of the device during its mounting within an engine.

What I therefore claim and desire to cover by letters patent is:

1. A pushrod inclosure of the tubular telescoping type including in combination, a pair of telescoping members, comprising an outer telescoping member and an inner telescoping member movable with respect to each other upon a common longitudinal axis, said telescoping members having a bearing surface bearing against each other as they move longitudinally along said axis, external flanges inwardly spaced from the outer or free ends of said telescoping members, annular gaskets arranged over the free ends of said telescoping members and operative in use to bear against said flanges to provide an oil seal therebetween and the free ends of said telescoping members, said inner telescoping member having a diametrically reduced inner tubular portion to form therebetween and said outer telescoping member on annular recess, gasket means arranged within said recess, spring means interposed between said gasket means and said outer telescoping member and operative in use to compress said gasket means in oil sealing relation between said telescoping members while urging the said telescoping members in opposite directions along said longitudinal axis.

2. A pushrod inclosure as claimed in claim 1 wherein the external flanges are disposed in predetermined spaced relation inwardly from the outer ends of said inclosure.

3. A pushrod inclosure as claimed in claim 2 wherein outwardly from said flanges the ends of the inclosure diminishes gradually in diameter.

4. A pushrod inclosure as claimed in claim 1 wherein the ends of said inclosure are reduced in diameter to receive thereover annular gaskets.

5. A pushrod inclosure as claimed in claim 1 wherein the annular gasket retaining recess formed between the two telescoping members exceeding in length the thickness of said gasket means.

* * * * *